J. W. BOYNTON.
HACKSAW MACHINE.
APPLICATION FILED JAN. 27, 1916.

1,290,497.

Patented Jan. 7, 1919.
7 SHEETS—SHEET 1.

INVENTOR
JOHN W. BOYNTON

BY *Ellis Spear Jr.*
ATTORNEY

J. W. BOYNTON.
HACKSAW MACHINE.
APPLICATION FILED JAN. 27, 1916.

1,290,497.

Patented Jan. 7, 1919.
7 SHEETS—SHEET 4.

INVENTOR
JOHN W. BOYNTON

BY *[signature]*
ATTORNEY

J. W. BOYNTON.
HACKSAW MACHINE.
APPLICATION FILED JAN. 27, 1916.

1,290,497.

Patented Jan. 7, 1919.
7 SHEETS—SHEET 5.

INVENTOR
JOHN W. BOYNTON

BY *(signature)*
ATTORNEY

UNITED STATES PATENT OFFICE.

JOHN W. BOYNTON, OF ATHOL, MASSACHUSETTS, ASSIGNOR TO THE L. S. STARRETT COMPANY, OF ATHOL, MASSACHUSETTS, A CORPORATION OF MASSACHUSETTS.

HACKSAW-MACHINE.

1,290,497.      Specification of Letters Patent.      Patented Jan. 7, 1919.

Application filed January 27, 1916. Serial No. 74,580.

*To all whom it may concern:*

Be it known that I, JOHN W. BOYNTON, a citizen of the United States, residing at Athol, county of Worcester, Commonwealth of Massachusetts, have invented certain new and useful Improvements in Hacksaw-Machines, of which the following is a specification.

This invention relates to hack saw machines and particularly to a power hack saw machine.

In such machines the saw frame is usually weighted to hold the saw to the work during the cutting stroke thereof. The delicate nature of the saw blade itself and the rapidity at which these machines operate require special refinements in the feed mechanism, since any excessive shock to the teeth in urging the saw to the work or in moving the saw through its return or non-cutting stroke is liable to seriously injure the teeth. Where the saw has simply been dragged across the work on its return stroke, the teeth have been particularly liable to injury. It has therefore been proposed to positively elevate the saw on its return stroke, thereby clearing the teeth from the work. Experience has shown, however, that where the saw is positively raised at the completion of its cutting stroke, it is practically impossible to quickly replace the saw in contact to begin a new cutting stroke without excessive shock to the teeth, due to the lowering of the saw from its elevated position to its position in the saw cut, and this is especially so where the saw is lifted a substantial distance from the work at the end of its cutting stroke. Moreover, in such lowering there is a noticeable tendency on the part of the teeth to catch the sides of the saw cut.

Furthermore the rapid raising of the weighted saw has a most destructive effect on the ratchet teeth or other mechanism employed in making the lift.

The present invention contemplates a power hack saw machine wherein the saw is automatically returned to position to begin a new cutting stroke without lifting the saw from the saw cut. According to the present invention, on the return stroke of the saw the teeth travel backwardly in substantially the same path in which they advanced during the cutting stroke. This is effected by a grip and release mechanism which alternately interrupts and releases the normal gravity tendency of the feed pressure weights. This mechanism is actuated automatically from the power shaft of the machine and acts to positively grip the saw at the completion of a cutting stroke so as to lock it during the return stroke, and to automatically release the saw at substantially the moment it is in position to begin a new cutting stroke. The tendency of the saw when released to drop onto the work, with resultant injury to the teeth, is therefore eliminated, and the saw cut is correspondingly protected from abrasion.

The saw blade is held at a slight angle to the carrier slide, so that it clears very slightly on the back stroke, thus further relieving the teeth from wear due to contact with the bottom of the cut when being returned to position to begin its cutting stroke.

In addition to the above indicated features, the present invention embodies a novel mechanism for adjusting the stroke of the saw according to the size of material to be cut, allowing the full length of the saw to be utilized on all sizes of material within the range of the mechanism. This stroke adjusting mechanism has a definite relation to the work clamp itself so that as soon as this clamp is adjusted the stroke of the saw may be quickly and accurately regulated in accordance therewith.

These and various other features which will appear more fully hereinafter are secured in the machine of the present invention, the construction and operation of which is disclosed in the accompanying specification and drawings in which like reference characters are correspondingly applied throughout.

I have indicated at 1 a suitable supporting pedestal having a flat top 2 to which is bolted or otherwise secured a bed plate 3.

The work clamp for the work W consists of a fixed jaw 4 and a movable jaw 5. The movable jaw 5 is guided in suitable ways 6 formed on the bed plate, and is advanced toward and from the fixed jaw 4 by a feed screw 7 journaled in suitable bearings 8 on the bed 3 and provided beyond the end of the machine with an operating handle 9.

Figure 9:
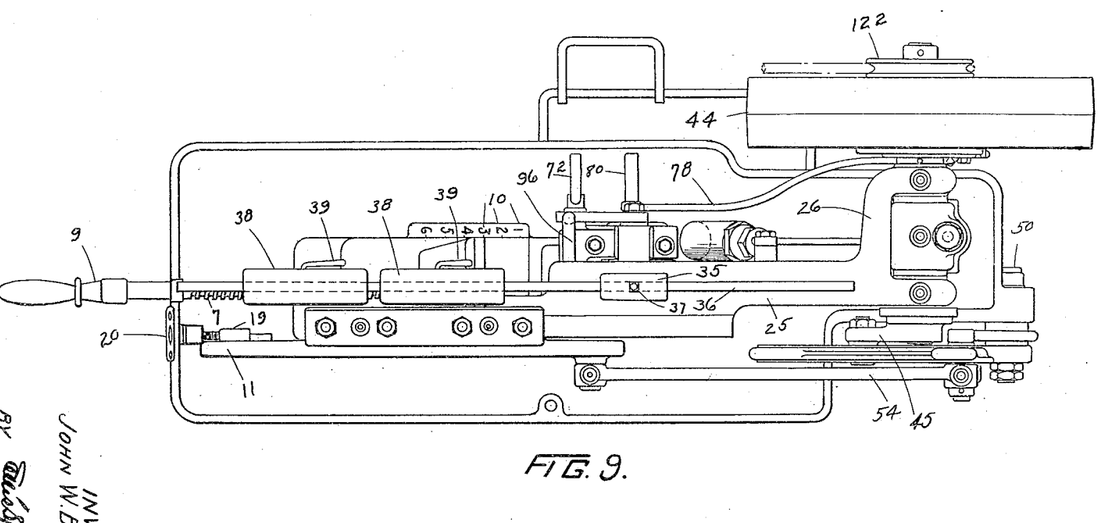
Fig. 9 is a plan view of the machine.

The bed plate 3 is provided adjacent the work clamp with a series of indications 10 (see Fig. 9) whereby the degree of separation of the jaws 4 and 5 may be accurately determined and the length of the power stroke of the machine be adjusted in accordance therewith as will be more fully explained hereinafter. In the embodiment shown, these indications 10 consist of the numerals 1, 2, 3, 4, 5, and 6.

The numeral 11 indicates a vertically movable reciprocating saw frame. The opposite ends of the frame 11 are formed as bearings $11^1$ in which are mounted stems 12 to which a saw blade 13 is detachably connected and set at a slight angle to the frame back for clearance.

The blade 13 is adapted to be strained to tension by any suitable tension device as the tension lever 14. The lever 14 is pivoted between its ends 15 in suitable ears 16 projecting from one arm of the frame 11. The free end of said lever plays between the bearing $11^1$ for one of the stems 12 and a pin 17 on said stem. The opposite end of the lever 14 is suitably formed to receive a threaded stem 18 working in a bearing 19 on the saw frame 11. The stem 18 and consequently the lever 14 is adjusted by any suitable device as the hand wheel 20, thereby applying tension to the saw or relieving the saw of the tension.

Figures 2, 3:
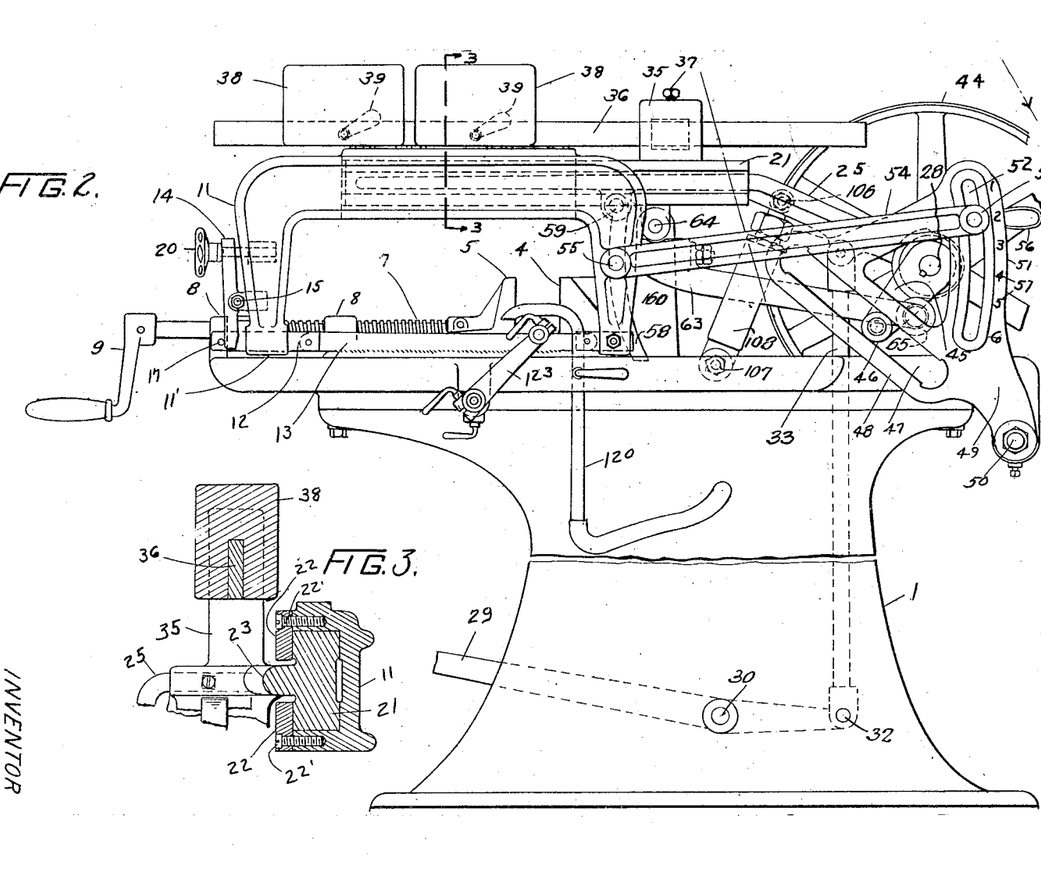
Fig. 2 is an elevation view from the opposite side.
Fig. 3 is a detail section on the line 3—3 of Fig. 1.

The saw frame 11 is mounted in vertically swingable relation to the power shaft 28 of the machine and swings about said shaft as a pivot. The structure for so mounting said frame consists of a horizontally disposed pivot arm 25, having a downwardly extending forked end 26. The forks 26 are formed as annular bearings through which a bushing 27 about the power shaft 28 is inserted and secured. From the forks 26 the arm 25 extends upwardly and horizontally, and terminates in a tapered rib 23 which is cast on a horizontally disposed guide portion 21 for the saw frame. The guide 21 and arm 25 are therefore cast in one piece. The connecting arm of the saw frame is channeled in cross section (see Fig. 3) and in order to cause the frame to substantially wholly embrace the guide portion 21, two spaced strips 22 are secured by screws or equivalent fastenings $22^1$ to opposite edges of one face of said connecting arm, as clearly shown in Fig. 3.

Figure 10:
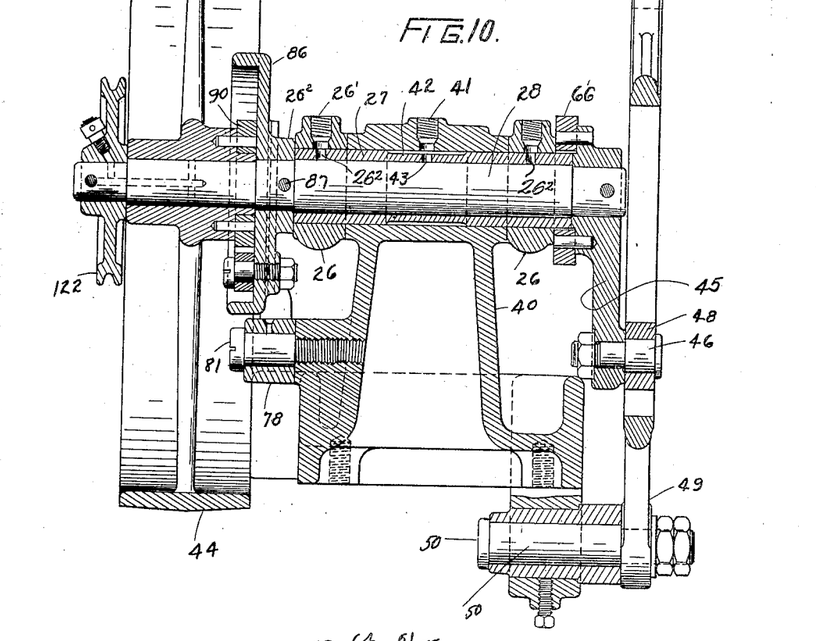
Fig. 10 is a transverse section across the machine at the power shaft end thereof.

The forks 26 of the arm 25 are provided with suitable oil cups $26^1$ and the sleeve or bushing 27 is suitably bored, as indicated at $26^2$ (Fig. 10) whereby lubricant may be introduced to the power shaft. The bushing 27 itself is set in a suitable bearing 40 rising from the bed plate 3. The bushing 27 is held against rotation by a screw passing through the slotted housing, which housing is an integral part of the bed. The bearing 40 has an oil cup 41, and the bushing is circumferentially grooved as indicated at 42 and bored at 43 adjacent said cup in order to permit lubricant introduced through the cup 41 to reach the power shaft.

The arm 25 and therefore the saw frame is swung about the power shaft as a pivot.

Feed pressure may be applied to the saw frame in any suitable manner, as by weights or spring. I prefer to apply this pressure by weight, and for this purpose the arm 25 has a bearing 35 rising therefrom through which a weight carrying arm 36 is adjustably mounted. The adjustment of the arm 36 is held by a set screw or equivalent device 37, in said bearing. The weights 38 are in turn adjustable along the arm 36 and their adjustment is held by the screw levers 39.

The saw frame is reciprocated from the power shaft by any suitable motion converting mechanism which transmits the rotation of the power shaft as reciprocatory motion applied to the said frame. Loose on the power shaft, near one end thereof, is a pulley 44, belted to a suitable source of power and designed to be alternately clutched to and released from said shaft by an automatic clutch mechanism described hereinafter. Fast on said shaft near the opposite end therof is a crank arm 45 carrying a slide element 46 working in a slot 47 in one arm 48 of a triangular lever 49 pivoted at 50 to the bed plate 3. The lever 49 has a quadrant portion 51 provided with a slot 52 in which works a slide element 53 on a pitman 54, the opposite end of which is fastened at 55 to one arm of the saw frame 11.

The rotation of the power shaft is therefore converted into reciprocatory motion by the crank 45 to swing the lever 49 on its pivot 50. This swinging motion is transmitted to the saw frame as reciprocatory motion by the pitman 54 to move the saw back and forth across the work W held in the clamp 4—5.

The effective throw or stroke of the pitman and thus the saw frame is adjusted by manually varying the position of the slide element 53 in the slot 52 of the quadrant arm 51 of the lever 49 and this adjustment is held by means of the shiftable locking device 56. This changes the effective available length of the slot 52 in which the slide 53 may play and therefore varies the effective lever arm of the pitman.

In order that the degree of adjustment may be accurately determined, the quadrant 51 adjacent the slot 52 is provided with a series of indications 57 (see Fig. 2) whereby the exact positioning of the slide 53 therein may be known. These graduations 57 are related to the graduations 10 adjacent the work clamp so that both the degree of separation of the jaws 4—5 and the stroke of the pitman 54 may be correspondingly adjusted according to the dimension and character of the work being cut.

In the present invention, means are provided for relieving the saw frame of the feed pressure in the return or non-cutting stroke of the saw without lifting the saw frame whereby the teeth of the saw blade are moved backwardly in substantially the same path in which they advanced during the cutting stroke, and are again moved into the work gently and without undue shock as soon as the saw reaches a position in which to begin a new cutting stroke. Such pressure relieving means consists broadly of an automatically operative gripping mechanism designed to intermittently engage and release a part of the saw frame whereby to alternately interrupt and release the downward gravity tendency of the feed pressure weights 39 and an actuating mechanism driven from the power shaft and designed to be alternately actuated and released by a cam on said shaft according to the relation of the same frame to its cutting or non-cutting stroke.

This pressure relieving mechanism more specifically consists of a curved arm 58 pivoted to the guide member 21 at 59 and depending loosely therefrom. This arm is adapted to be alternately gripped and released according to whether the saw is on its cutting or non-cutting stroke by a spring tensioned plunger 60 having a cylindrical head 61. The end of the plunger 60, exposed to the arm 58, is formed as a bearing face rounded circumferentially (to conform to the arm 58) but flat in the direction of its width, i. e., transversely of the machine, so as to provide the same bearing to the arm at all points across said exposed face. The plunger 60 is reciprocally mounted in the chambered end 62 of a cam actuated lever 63 pivoted at one end at 64 to a casting 160 rising from the bed 3, and having a roll 65 at its other end disposed for alternate actuation and release by a cam 66 fast on the crank 45. Confined within the chamber 62 between the rear wall thereof and the head 61 of the plunger is a coil spring 67, the normal tendency of which is to maintain the head 61 in gripping contact with the arm 58. Beyond said rear wall the plunger stem is threaded as indicated at 68 to receive one or more check nuts 69 adapted to set up against said rear wall to hold the adjustment of the plunger. The head of the plunger has a longitudinal channel 70 (see Fig. 8) coöperating with a suitable set screw 71 through the chamber 62 to guide the plunger in its reciprocations and to prevent the plunger turning in the chamber under the action of the spring 67.

The plunger head is normally engaged with the curved arm by the action of the spring 67. When the machine is started, it is necessary to release this engagement in order to permit the saw to descend into the work on the cutting stroke thereof. This release is effected manually through a link release pin 72 rotatably mounted in a bearing 73 formed on a lateral extension 161 of the casting 160. The pin 72 has a flat 74 between its ends against which a release stud 75 is adapted to bear. The stud 75 is guided in a boss 76 formed on the bearing 73. Beyond the bearing 73 the pin 72 is provided with an operating handle 77 whereby the pin may be rotated manually. Such rotation causes the pin through its flat 74 to move the stud 75 against the head of the plunger 60 overcoming the spring 67 and causing the head to release the link 58. As soon as the stud 75 is released, that is, as soon as the saw begins its cutting stroke, the pressure on the spring 67 is removed and the plunger is returned to position to again grip the link 58. This grip does not occur however until the cam 66 has made a half revolution thereby bringing its dwell $b$ against the cam roll of the lever 63 and moving said lever toward the arm whereby to positively grip it on the return or non-cutting stroke of the saw. The dwell $b$ of the cam extends half way around the periphery of the cam. The low part of the cam is indicated by the reference character $a$. The cam roll 65 is therefore engaged by the dwell $b$ during one half the revolution of the cam and the cam is so set on the power shaft that this engagement occurs during the return stroke of the saw.

It will therefore be evident that the arm 58 is alternately released and gripped on the cutting and non-cutting strokes respectively of the saw, through the action of the cam 66. This alternately applies and relieves the saw of the feed pressure of the weights 39 permitting the saw teeth to move back in the saw cut without lifting on the return stroke and in substantially the same path traversed in the cutting stroke.

Figure 8:
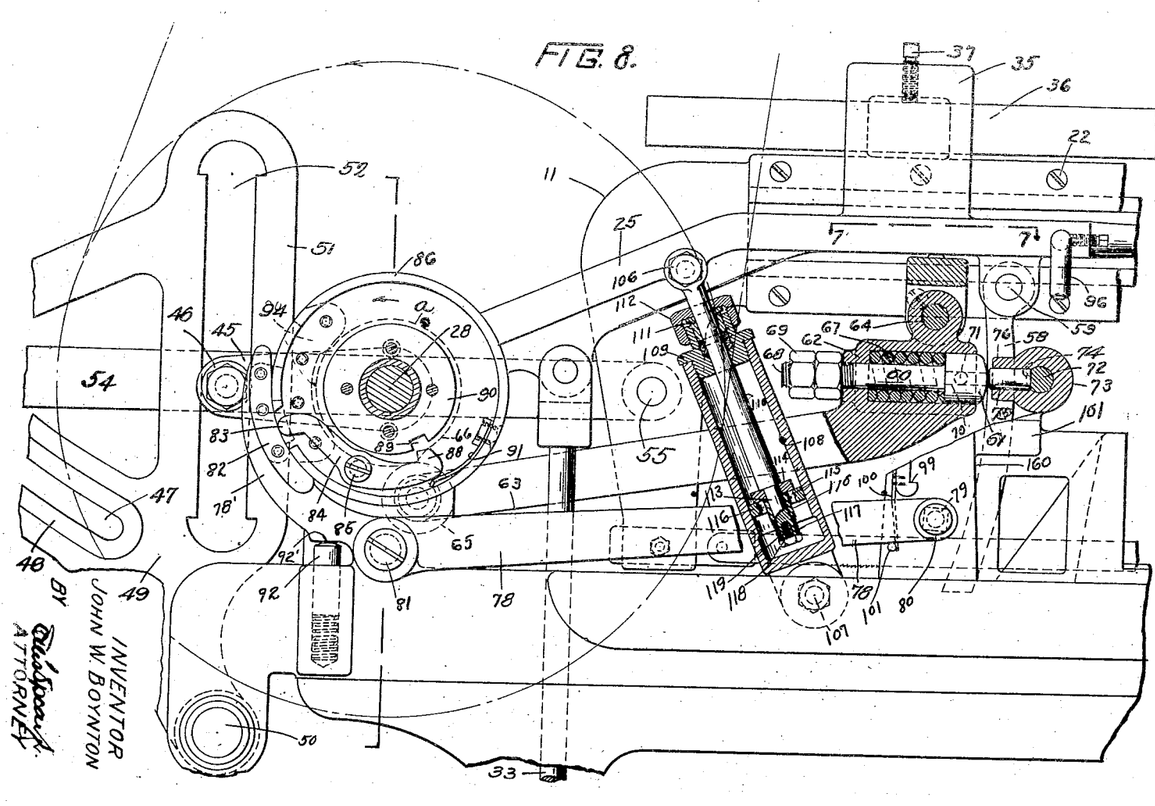
Fig. 8 is an enlarged view, partly in section, of the head of the machine and particularly illustrating the relation of the gripping mechanism to the rest of the machine.

The power is automatically applied and thrown out at or near the end of each stroke by a clutch mechanism comprising a pivoted lever 78 adapted to be initially actuated by a manually operable starting handle 80 which is set through the end of the lever 78 and held thereon by a squared nut 79. The lever 78 is pivoted between its ends at 81 to the bed plate and beyond said pivot is curved upwardly as indicated at $78^1$ and best shown in Fig. 8. Fastened to this curved end is an actuating dog 82 disposed for tripping engagement with one end 83 of a double ended pawl 84 pivotally mounted at 85 on a pawl disk 86 pinned on the power shaft by the pin 87 (see Fig. 10). The other end 88 of the pawl 84 is disposed for engagement in the notch 89 of a ratchet disk 90 carried by the hub of the driving pulley 44 (Fig. 8). The end 88 of the pawl is normally held in engagement with the notch 89 by a blade spring 91 fastened to the pawl disk 86 with its free end bearing against the under face of the pawl.

Spring tension is applied to the starting lever 78 by a spring backed pin 92 mounted in a socket in the bed plate, (see Fig. 8) and engaging a shoulder $92^1$ on said lever just beyond its pivot 81. When the saw has cut entirely through the work and the starting lever is released by a trip device hereinafter described, this pin 92 serves to throw the curved end $78^1$ of the lever 78 into the path of the pawl 84 so that when the rotation of the pawl disk 86 brings the pawl around, its end 83 will engage the dog 82, thereby rocking the pawl on its pivot and throwing its end 88 out of the notch 89 of the disk 90 to disconnect the power.

Figure 11:
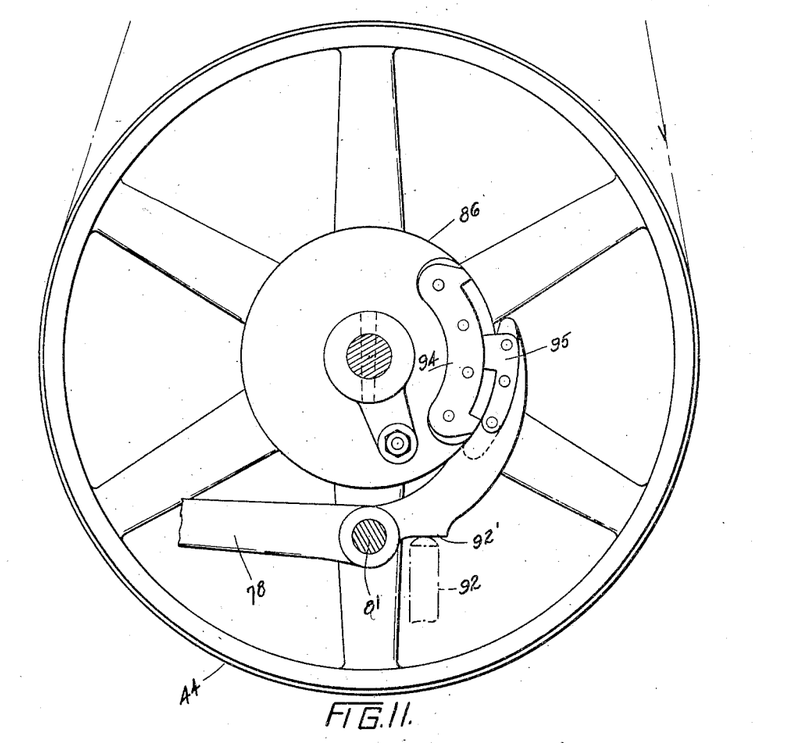
Fig. 11 is a detail view at right angles to Fig. 10 and viewed from the left of said figure.

The pawl disk 86 is provided on its opposite face with a double ended stop 94 which defines with the disk 86 a curved recess $94^1$ in which a dog 95 (see Fig. 11) on the opposite face of the starting lever 78 is disposed. This device constitutes an emergency stop and its action is as follows. In the event that after the pawl 84 has been positively disengaged from the notch of the disk 90 by the dog 82, the power pulley 44 should for any reason stick on the shaft 28 and therefore tend to rotate said shaft with resultant damage to the saw teeth, the emergency stop 94—95 will operate to positively lock the shaft against rotation. The action of this stop would be to bring one of the two ends of the member 94 into contact with the dog 95 on the lever 78 thereby positively preventing further rotation of the power shaft.

Figures 4, 5:
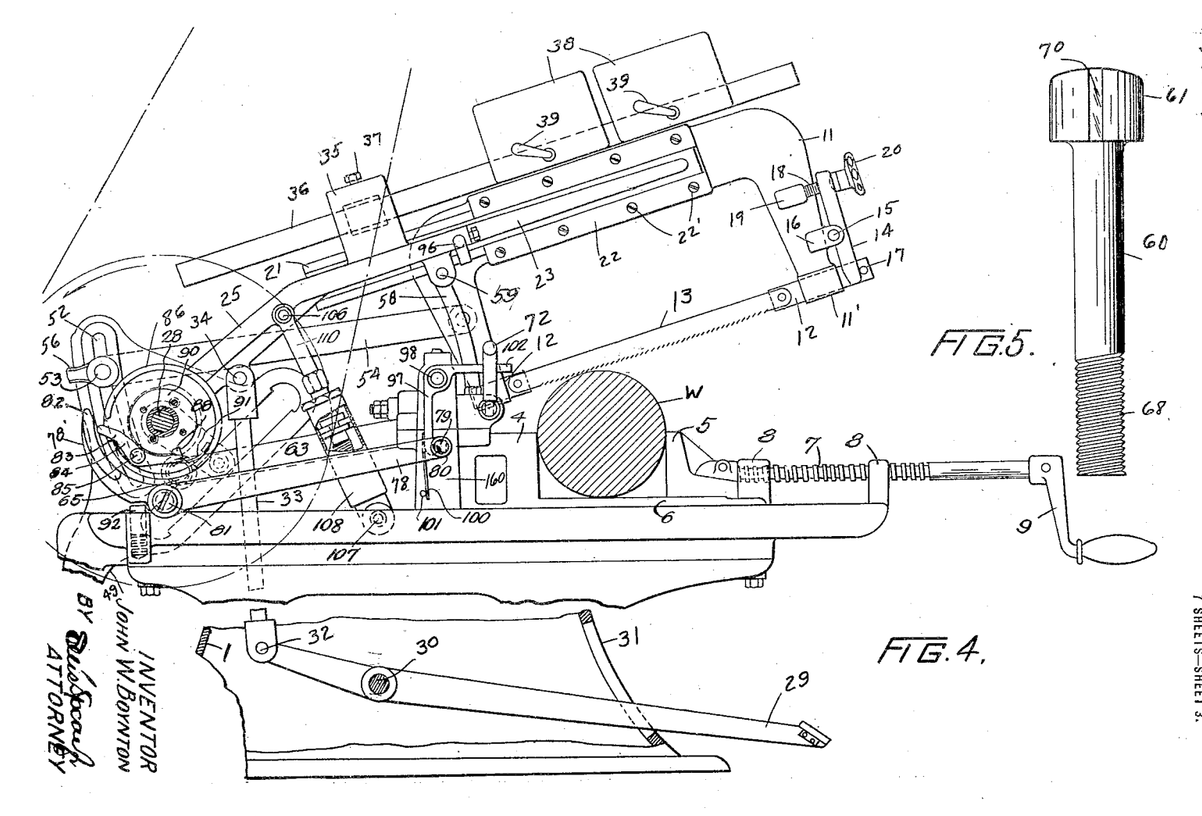
Fig. 4 is a view similar to Fig. 1 and showing the position of the parts at the beginning of the cutting operation.
Fig. 5 is a detail view of one of the members of the gripping mechanism for automatically relieving the saw of the feed pressure.
Figure 6:
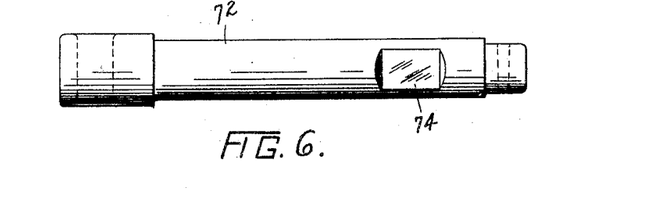
Fig. 6 is a detail view of the releasing cam which is manually operated when it is necessary to release the locking or gripping mechanism in order to raise the saw to insert new work.
Figure 7:
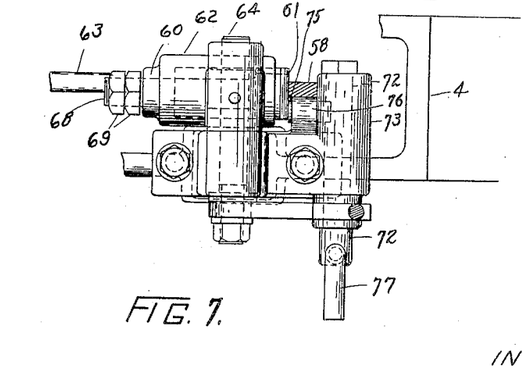
Fig. 7 is an assembled view of such mechanism as viewed on the line 7—7 of Fig. 8.

In the operation of the clutch mechanism and associated parts, the starting handle 80 is initially lifted to engage it with a pivoted latch 97 (see Fig. 4). This swings the lever 78 on its pivot, causing the dog 82 to swing down away from the end 83 of the pawl 84. The spring 91 then forces the end 88 of the pawl into the notch 89 of the ratchet disk 90. This couples the pawl disk 86 to ratchet disk 90, which rotates with continuously running loose pulley 44, and since the disk 86 is fast on the power shaft 28, said shaft is revolved.

During the cutting action of the machine, the dog 82 of the lever 78 is normally positioned, out of the path of the pawl 84 on the disk 86, (see Fig. 4) and the stop 94 on said disk simply rotates freely without effect on the dog 95 of said lever. When, however, the saw has cut entirely through the work, the starting lever is automatically released by a release mechanism hereinafter described and the curved end $78^1$ of said lever is moved by the spring pin 92 into the path of the rotating disk 86. This brings the dog 82 in position to be engaged by the end 83 of the pawl 84 and said engagement rocks the pawl on its pivot 85, tipping the end 88 thereof out of the notch 89 on the ratchet disk 90. If for any reason this fails to disconnect the power, the continued rotation of the pawl disk brings one of the ends of the double ended stop 94 into contact with the dog 95 on the opposite face of the starting lever 78 thereby positively checking the rotation of said disk and throwing out the power.

The mechanism for automatically disconnecting the clutch when the saw has continued entirely through the work consists of a right angled trip lever 96 carried by the saw frame and a latch 97 pivoted at 98 to the casting 160 and having a hooked end 99 disposed for latching engagement with the starting lever 78. The clutch is backed at this end by a blade spring 100 fastened to the latch and playing against a pin 101 on the casting 160. The normal tendency of the spring 100 is to maintain the hooked end of the latch in position to be engaged by the squared nut 79 on the starting handle 80, when said handle is lifted to engaging position in starting the machine.

The other end 102 of the latch is disposed horizontally at substantially right angles to the portion 99 so as to project in the path of the trip lever 96. When the saw cuts entirely through the work, the frame has lowered sufficiently to permit the trip 96 to strike the arm 102 of the latch, moving the opposite end 99 thereof backwardly against the spring 100 and out of engagement with the starting lever which is consequently released and through the mechanism before described disconnects the power.

In the present machine a lubricant is supplied to the work in any desired manner, as by means of a pump P secured to the frame at any convenient place and a connection 120 to the work. The pump P is provided with a pulley 121 which is adapted to be belted to a pulley 122 fast on the drive shaft of the machine. The arrangement is such therefore that the pump is driven and lubricant supplied only while the machine is in operation, thereby effecting a saving in the lubricant used.

Any suitable work gage, as the gage, 123, may be mounted adjacent the work clamping jaws 4 and 5.

The complete operation of the machine is as follows:

The handle 77 of the pinch pin 72 is first manually operated to release the pivot arm 58 and permit the saw to be raised. The arm 25 is raised, and with it the saw and weights, to the position shown in Fig. 5. The work is then inserted between the clamping jaws 4 and 5, and these jaws properly adjusted. At this time the throw of the pitman 54 may be adjusted by means of the hand device 56 as before described, and the extent of this adjustment with relation to the adjustment of the work clamping jaws may be accurately determined by means of the respective series of related graduations of these parts. The operative next lifts the starting handle 80, to cause the squared nut 79 thereof to engage the hooked end 99 of the latch 97. This movement of the starting lever carries the dog 82 thereof away from the exposed end 83 of the double ended pawl 84, permitting the spring 91 for said pawl to move its other end 88 against the periphery of the notched disk 90 in position to snap into the notch 89 thereof when the pawl begins to revolve. Inasmuch as the pulley 44 is constantly revolving, and until the clutch is thrown in, revolves as a loose pulley, the disk 90 acts to connect the power to the shaft when the clutch is thrown in.

When the clutch is thrown in, the crank arm 45 begins to revolve swinging the triangular plate 49 about its pivot 50 and causing the pitman 54 to draw the saw rearwardly and downwardly, which direction is the cutting stroke of the saw. During the cutting stroke of the saw the cam roll 65 of the lever 63 is engaged by the low part $a$ of the cam 66 on the drive shaft and the curved arm 58 of the saw frame is therefore not gripped by the plunger carried by said lever 63 so that the saw may descend to the work and make a cut. When the saw reaches the end of its cutting stroke, the high part or dwell $b$ of the cam 66 engages the cam roll 65 of the roll 63 causing said lever through its plunger 68 to positively grip the arm 58 thereby locking the saw frame in this position. The continued rotation of the shaft 28 swings the saw frame back to position to start a new cutting stroke and during this return of the saw frame the high part $b$ of the cam 66 maintains the grip of the plunger 68 on the curved arm 58. The saw frame is therefore moved on its return stroke without lifting the saw from its kerf and without liability of the teeth marring the sides of the saw cut, or being injured by dropping into the kerf when the feed pressure is released. When the saw frame reaches the end of its return stroke, the high part of the cam 66 has rotated past the cam roll 65. The roll 63 is therefore released, and a consequent release of the curved arm 58 is effected, so that the saw may descend to the work under the pressure exerted by the feed weights, 38. This action is automatically repeated until the work is cut through.

When the saw cuts through the work the trip lever 96 on the saw frame strikes the horizontal arm of the latch 97, tipping said arm downwardly, and causing the hooked end of said latch to release the starting lever. The starting lever 78, being thus released, is acted upon by the spring pressed pin 92 to cause its dog 82 to move into the path of the pawl 84 on the disk 86, and said pawl is tripped out of the notch 89 of the disk 90 when its revolution brings the end 83 thereof into contact with the dog 82. This throws out the power and the drive shaft stops, the pump P being also stopped. The drive pulley 44 however continues to rotate but as a loose pulley. In order to prevent shock on the teeth when the saw is released at the end of each return stroke, and in order to permit the saw to settle into the cut gently and without shock so that it will be "floated" as it were, during its cutting action, I interpose between the pivoted arm 25 carrying the saw frame and the bed plate 3, a suitable motion checking device which in the embodiment shown, is in the form of an oil piston. As shown in Fig. 8 most clearly, I provide a cylinder 108 formed at its lower end to receive a fastening 107 which connects this end of the cylinder to bed 3 of the machine. This cylinder is adapted to be filled with any proper fluid such as a heavy oil, and is provided with a suitable closure at its upper end. The piston stem 110 is pivoted at its upper end at 106 to the saw frame arm 25 and passes through a cap 109 inclosing a stuffing box 111 in which a packing is compressed by a cap 112 screwed on to the reduced projected end of the closure cap 109. The lower end of the stem is reduced as indicated at 113, and carries a disk 114 adapted to seal a plurality of openings 115 in a piston 116, slidably fitting within the casing 108, and having an extended hub 117, sleeved about the reduced end of the stem, whereby to move with said stem. Bearing against the lower edge of the hub 117, and confined between it and the head of a screw 118, set in the lower end of the stem 110 is a coil spring 119, the normal tendency of which is to maintain the members 114 and 116 in sealing relation.

Figure 1:
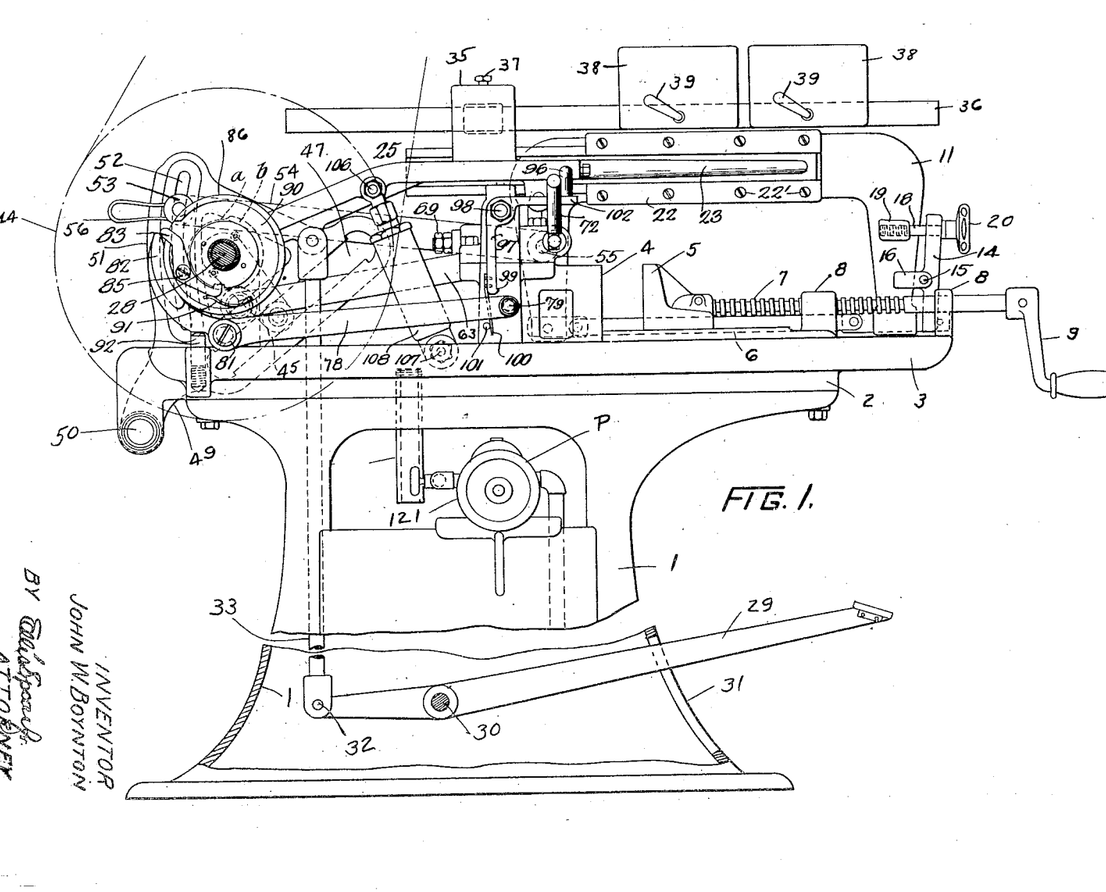
Figure 1 is an elevation, partly in section of a power hack saw machine in accordance with my present invention and showing the position of the parts after the saw has cut.

In my construction, the operator is relieved of the necessity of manually raising the saw frame and of holding it in a raised position while inserting new work into the work clamp, thus leaving his hands free to properly adjust the work. The saw frame is raised by the weight of the operator applied to a treadle 29 pivoted near the base of the machine frame and operatively connected to the saw frame supporting arm 25 by a link 33. When elevated to its raised position by said treadle, the saw frame is supported by the oil piston. In the operation of the treadle, the raising of the arm 25 lifts the stem 110 from the position shown in Fig. 1, to the position shown in Fig. 4, against the pressure of the fluid as it passes through the openings 115. This pressure is sufficiently great to counteract the tendency of the spring 119, to maintain the members 114 and 116 in sealed relation, and therefore permits the separation of said members and a consequent passage of the fluid through the openings 115 from above the piston to the side below. This action is entirely automatic and the dash pot therefore, not only permits the saw to "float" down into the cut at each rapid release of the saw by the gripping device, but also assists to check vibration, and tends to keep the saw blade steady in the kerf during the cutting action.

From the foregoing therefore it will be seen that the action of the machine after starting is to intermittently interrupt and release the downward gravity tendency of the feed pressure weights to urge the saw into the work, and that when this tendency is interrupted by the grip and release mechanism, the saw is locked at the completion of its cutting stroke and is returned to position to begin a new cutting stroke without lifting and in substantially the path traversed during the cutting stroke. It will further be noted that in the present invention, feed pressure is exerted by the weights 38 and no additional devices for counterbalancing the saw frame are required. The saw itself is permitted to settle down into the cut, after it has been carried back to position to begin a new cutting stroke and released by the intermittent grip action which is to permit the saw to descend to the work gently and without shock under the downward tendency of the feed pressure weights. The action of the machine is therefore smooth and practically without shock.

The feature of floating the saw frame on the piston of an oil filled cylinder resistant to the downward gravity feed but non resistant to the uplift of the saw frame and the treadle lift therefor are merely illustrated herein as showing my machine in its commercial form, but are not my invention and are not claimed herein.

Various modifications in the construction and operation of my machine may obviously be resorted to without departing from the spirit of my invention if within the limit of the appended claims.

What I therefore claim and desire to secure by Letters Patent is:

1. In a cutting machine, in combination, a cutting element, means for exerting feed pressure upon said cutting element, means for gripping the cutting element to relieve the feed pressure thereon at the completion of a cutting stroke, means effective when the cutting element is gripped to return said element to position to begin a new cutting stroke without lifting said element from the cut previously made, and means whereby said gripping means is automatically released on the operative stroke of the cutting element.

2. In a cutting machine, in combination, a cutting element, means for exerting feed pressure upon said cutting element, means for automatically gripping the cutting element to relieve the feed pressure thereon at the completion of a cutting stroke, means effective when the cutting element is gripped to return said element to position to begin a new cutting stroke without lifting said element from the cut previously made, and means whereby said gripping means is automatically released on the operative stroke of the cutting element.

3. In a cutting machine, in combination, a cutting element, means for normally exerting feed pressure on said element during the cutting stroke thereof, means for gripping said element to prevent the feed thereof on the non-cutting stroke, means effective when the cutting element is gripped to return said cutting element to position to begin a new cutting stroke without lifting said element from the cut previously made and in substantially the line traversed on the cutting stroke, and means whereby said gripping means is automatically released on the operative stroke of the machine.

4. In a cutting machine, a cutting element, means for normally exerting feed pressure thereon during its cutting stroke, a member carried by said cutting element, means for gripping said member to prevent feed of the cutting element on the non-cutting stroke, and means effective when said member is gripped to return the cutting element to position to begin a new cutting stroke without being lifted from the cut previously made and in substantially the line traversed on the cutting stroke.

5. In a cutting machine, a cutting element, means for normally exerting feed pressure on said cutting element, automatic means for alternately gripping and releasing said cutting element to prevent and permit the feed thereof according to the position of the cutting element, and means effective when the cutting element is gripped to return said element to position to begin a new cutting stroke without being lifted from the cut previously made and in substantially the line traversed on the cutting stroke.

6. In a cutting machine, a cutting element, means for locking said element to prevent feed thereof at the end of its operative stroke, means effective when the cutting element is locked to return said element to position to begin a new cutting stroke without lifting said element from the cut previously made and in susbtantially the line traversed on the cutting stroke, and means whereby said locking means is released on the operative stroke of the cutting element.

7. In a cutting machine, in combination, a cutting element and a power shaft, means actuated from said power shaft for automatically locking said element to prevent feed thereof at the end of its operative stroke, means effective when said cutting element is locked to return said cutting element to position to begin a new cutting stroke without lifting said element from the cut previously made and in substantially the line traversed on the cutting stroke, and means whereby said locking means is automatically released on the operative stroke of the cutting element.

8. In a cutting machine, in combination, a cutting element and a power shaft, feed means for said cutting element, an automatic device for alternately gripping and releasing said cutting element actuated by said shaft, and adapted to alternately prevent and permit the feed of the cutting element, and means effective when said cutting element is gripped to return said element to position to begin a new cutting stroke without being lifted from the cut previously made.

9. In a cutting machine, a power shaft, a cutting element, feed means for said cutting element, a member carried by said element, an automatic device for alternately gripping and releasing said member actuated from said shaft and adapted to alternately prevent and permit the feed of the cutting element, according to the position of said element, and means effective when said member is gripped to return said cutting element to position to begin a new cutting stroke without being lifted from the cut previously made.

10. In a cutting machine, a cutting element, means for exerting feed pressure thereon, automatic means for gripping said cutting element to prevent the feed thereof, means effective when said cutting element is gripped to return said element to position to begin a new cutting stroke without being lifted from the cut previously made, means whereby said gripping means is automatically released on the operative stroke of the cutting element, and manual means whereby said gripping means may be initially released.

11. In combination, a saw, a feed mechanism therefor, an automatic locking means adapted to positively grip the saw at the end of its cutting stroke and prevent feed thereof, and means effective when said saw is gripped to retract the saw without lifting it from the saw cut.

12. In a sawing machine, a saw, a driving mechanism therefor, means for normally exerting feed pressure on said saw, a member carried by said saw, means for gripping said member to prevent the feed of the saw, means whereby said gripping means is released on the operative stroke of the saw, said means including a spring tensioning plunger actuated from the saw driving mechanism and disposed in gripping relation to said member, and manual means whereby said gripping means may be initially released.

13. In a sawing machine, a power shaft, a cam thereon, a saw driven from said shaft, means for exerting feed pressure on said saw, a member carried by said saw, a grip and release mechanism for said member including a lever pivotally connected with said saw frame and actuated by the cam on said power shaft, and a spring controlled plunger carried by said lever and disposed for alternate engagement with and disengagement from said member.

14. In a sawing machine, a power shaft, a cam thereon, a saw driven from said shaft, gravity means for exerting feed pressure on said saw, a member carried by said saw, a grip and release mechanism for said member including a lever pivotally connected with said saw frame and actuated by the cam on said power shaft, and a spring controlled plunger carried by said lever and disposed for alternate engagement with and disengagement from said member and a manually operable release for said plunger.

15. In a sawing machine, a power shaft, a saw frame driven therefrom, a curved arm depending from said saw frame, a lever actuated from said shaft, and a spring tensioned device carried by said lever and having an exposed head rounded circumferentially to conform to the curvature of said arm and flattened transversely of said arm and disposed for alternate grip and release of said arm.

16. In a sawing machine, a power shaft, a saw frame driven therefrom, a curved arm depending from said saw frame, a lever actuated from said shaft and having chambered end, a spring tensioned plunger carried by said lever in said chamber and having an exposed head rounded circumferentially to conform to the curvature of said arm and flattened transversely of said arm and disposed for alternate grip and release of said arm, and a manually operable release device for said plunger.

17. In a sawing machine, a power shaft, a saw frame driven therefrom, a curved arm depending from said saw frame, a lever actuated from said shaft, a spring tensioned plunger carried by said lever and having an exposed head rounded circumferentially to conform to the curvature of said arm and flattened transversely of said arm and disposed for engagement with said head and a manually operable release member having a flattened portion engageable with said first named member.

18. In a sawing machine, a member to be gripped, a gripping element releasably engaged therewith, and a release device for said element including a reciprocable member and a manually operable element having a flattened area engageable with said reciprocable member to urge the same against said gripping element.

19. In a sawing machine, a member to be gripped, a gripping element releasably engaged therewith, and a release device for said element including a reciprocable stud and a manually operable actuating pin having a flattened area engageable with said stud to urge the same against said gripping element.

20. In a sawing machine, a saw frame, feed pressure means therefor, a drive shaft, driving connections between said shaft and frame, means for gripping said frame to prevent the feed thereof, means whereby said gripping means is released on the operative stroke of the saw frame, a clutch mechanism for said drive shaft, a starting element having a portion for actuating said clutch, means for supporting said element during the operation of the machine, and a release for said supporting means effective upon completion of the cutting.

21. In a sawing machine, a saw frame, gravity feed pressure means therefor, a drive shaft, driving connections between said shaft and frame, a member carried by the saw frame, means for automatically gripping said member to prevent feed of the saw frame, means whereby said gripping means is automatically released on the operative stroke of the saw frame, a clutch mechanism for said drive shaft, a starting lever having a member for actuating said clutch, means for supporting said lever during the operation of the machine, and a release for said supporting means effective upon completion of the cutting.

22. In a sawing machine, a saw frame, gravity feed pressure means therefor, a drive shaft, driving connections between said shaft and frame, means for gripping said frame to prevent the feed thereof, means whereby said gripping means is released on the operative stroke of the saw frame, a clutch mechanism for said power shaft, a starting lever having a member for actuating said clutch, means for supporting said lever during the operation of the machine, and an automatic release for said supporting means effective upon completion of the cutting.

23. In a sawing machine, a power shaft, a member to be clutched rotating therewith, a clutch member pivotally mounted and disposed for operative connection with said rotating member, a starting member having a clutch actuating portion movable relative to said pivotally mounted clutch member, means normally tending to project said actuating portion toward said clutch member, and an automatic release device for said starting member effective upon completion of the sawing operation.

24. In a sawing machine, a power shaft, a member to be clutched rotating therewith, a clutch member pivotally mounted and disposed for operative connection with said rotating member, a starting lever adapted to have a latched and an unlatched position, a dog thereon adapted to have a position out of the path of said pivotally mounted clutch member and a position in the path of said member dependent upon the position of said starting lever, means normally effective to project said dog into the path of said clutch member, a latch for said starting lever, and an automatic release for said latch effective upon completion of the sawing operation.

25. In a sawing machine, a power shaft, a ratchet thereon, a pawl pivotally mounted and disposed for operative connection with said ratchet, a starting lever adapted to have a latched and an unlatched position, a dog thereon adapted to have a position out of the path of said pawl and a position in the path of said pawl, a spring engaging said starting lever and normally effective to project said dog into the path of said pawl, a latch for said starting lever, and an automatic release for said latch effective upon completion of the sawing operation.

26. In a sawing machine, a power shaft, a ratchet thereon having a notch, a double ended pawl pivotally mounted between its ends with one end disposed for engagement in the notch of said ratchet, means normally urging said end into said notch and a starting lever having a dog disposed for engagement with the opposite end of said pawl to rock said pawl upon its pivot.

27. In a sawing machine, a power shaft, a ratchet thereon having a notch, a double ended pawl pivotally mounted between its ends with one end disposed for engagement in the notch of said ratchet, a spring normally urging said end into said notch, a starting lever having a dog disposed for engagement with the opposite end of said pawl to rock said pawl upon its pivot, a latching device for said lever, and an automatic release for said latching device.

28. In a sawing machine, a power shaft, a pawl disk thereon, a pawl pivoted between its ends on said disk, a notched ratchet, a spring normally tending to maintain one end of said pawl in the notch of said ratchet, and a dog pivotally mounted and disposed to contact the opposite end of said pawl.

29. In a sawing machine, a saw frame, a trip device carried thereby, a power shaft, a clutch therefor, a starting member adapted to have a latched and an unlatched position, a latch for said member for maintaining it in its latched position and actuatably disposed relative to said trip device, and a clutch shifting element operated by said starting element.

30. In a sawing machine, a saw frame, a trip device carried thereby, a power shaft, a clutch therefor, a starting member adapted to have a latched and an unlatched position, a latch consisting of a right angled member pivoted between its ends and having one end disposed for actuation by said trip device and the other end disposed for latching engagement with said starting member, and a clutch shifting device carried by said starting member.

31. In a cutting machine, a power shaft, a cutting element driven therefrom, a clutch part on said power shaft, a complementary clutch part movable into and out of engaging relation to said first-named clutch part, a shifting device normally maintaining said movable clutch part in non-engaging relation, an actuating mechanism for said shifting device to cause said device to release said movable clutch part, and automatic means acting on said movable clutch part for moving it into engaging relation to said other clutch part upon actuation of said shifting device.

32. In a cutting machine, a power shaft, a cutting element driven therefrom, a clutch part on said power shaft, a complementary clutch part movable into and out of engaging relation to said first-named clutch part, a shifting device for said movable clutch part, a spring acting on said device to cause said device to normally maintain said movable clutch part in non-engaging relation, an actuating mechanism for said shifting device to cause said device to release said movable clutch part, and a spring acting on said movable clutch part for moving it into engaging relation to said other clutch part upon actuation of said shifting device.

33. In a cutting machine, a power shaft, a cutting element, a clutch mechanism including a clutch part on the power shaft, a complementary clutch part movable into and out of operative connecting relation to said first-named clutch part, a shifting mechanism for said movable clutch part, and an automatic emergency stop adapted to act on a part of said clutch shifting mechanism.

34. In a cutting machine, a power shaft, a cutting element, a clutch mechanism including a clutch part on the power shaft, a complementary clutch part movable into and out of operative connecting relation to said first-named clutch part, a shifting mechanism for said movable clutch part, and an automatic emergency stop comprising a pair of co-acting members carried, respectively, by one of the clutch parts and the clutch shifting mechanism.

35. In a cutting machine, a power shaft, a part to be clutched rotating therewith, a clutch part movable into and out of operative connection with said rotating clutch part, and an actuating mechanism for said complementary clutch part including a releasable member having a portion normally maintaining said complementary clutch part in disengaged relation to said rotating clutch part.

36. In a cutting machine, a power shaft, a part to be clutched rotating therewith, a clutch part movable into and out of operative connection with said rotating clutch part, and an actuating mechanism for said complementary clutch part including a releasable member having a portion normally maintaining said complementary clutch part in disengaged relation to said rotating clutch part, means for releasing said member to cause said portion to release said complementary clutch part, and automatic means acting on said complementary clutch part to move the same into engaging position relative to the rotating clutch part upon release of said member.

In testimony whereof I affix my signature in presence of two witnesses.

JOHN W. BOYNTON.

Witnesses:
VICTORIA LOWDEN,
GEORGE B. RAWLINGS.